United States Patent
Beetz

(10) Patent No.: US 8,067,864 B2
(45) Date of Patent: Nov. 29, 2011

(54) ELECTRIC MOTOR SEALING CONFIGURATION

(75) Inventor: Klaus Dr. Beetz, Karlsruhe (DE)

(73) Assignee: Mahle International GmbH (DE)

( * ) Notice: Subject to any disclaimer, the term of this patent is extended or adjusted under 35 U.S.C. 154(b) by 220 days.

(21) Appl. No.: 12/158,601

(22) PCT Filed: Oct. 21, 2006

(86) PCT No.: PCT/DE2006/001859
§ 371 (c)(1),
(2), (4) Date: Jun. 20, 2008

(87) PCT Pub. No.: WO2007/071220
PCT Pub. Date: Jun. 28, 2007

(65) Prior Publication Data
US 2008/0315692 A1    Dec. 25, 2008

(30) Foreign Application Priority Data
Dec. 22, 2005   (DE) .......................... 10 2005 062 021

(51) Int. Cl.
*H02K 5/12*    (2006.01)
*H02K 9/16*    (2006.01)
*H02K 5/128*   (2006.01)

(52) U.S. Cl. ............ 310/52; 310/57; 310/60 R; 417/356; 251/129.1; 251/122

(58) Field of Classification Search ............ 310/52, 310/227, 152, 156.01, 156.08, 156.09, 54, 310/55, 56, 57, 60 R; 417/356, 424; 251/129.11, 251/122; H02K 5/12, 5/167, 7/14, 7/16, H02K 9/16, 5/128, 29/00
See application file for complete search history.

(56) References Cited

U.S. PATENT DOCUMENTS

| | | | |
|---|---|---|---|
| 3,138,105 A | * | 6/1964 | White .............................. 310/86 |
| 3,411,450 A | * | 11/1968 | Clifton .......................... 310/104 |
| 3,853,429 A | * | 12/1974 | Wiedenmann ................ 417/356 |

(Continued)

FOREIGN PATENT DOCUMENTS
DE        41 11 466        10/1992

(Continued)

OTHER PUBLICATIONS

English Abstract for DE 101 03 209.

(Continued)

*Primary Examiner* — Quyen Leung
*Assistant Examiner* — Michael Andrews
(74) *Attorney, Agent, or Firm* — Rader, Fishman & Grauer PLLC

(57) ABSTRACT

An electric motor for driving an inertia separator is provided, including a stator and a rotor. The stator is arranged in a stator space enclosed by a stator housing. The rotor is arranged in a rotor space concentrically with the stator with regard to an axis of rotation. A ring gap is formed radially between the rotor and the stator such that it separates the stator space from the rotor space. A housing bottom includes a nonmagnetic section extending through the ring gap. An inertia separator includes a second rotor operably connected to the rotor. A separator housing encloses a void containing the second rotor, wherein the housing bottom is arranged on the separator housing on a side facing the electric motor such that the nonmagnetic section of the housing bottom defines an opening in the rotor space that is oriented towards the void.

21 Claims, 2 Drawing Sheets

U.S. PATENT DOCUMENTS

| | | | | |
|---|---|---|---|---|
| 5,025,930 | A | * | 6/1991 | Barthelmess ................ 310/90.5 |
| 5,092,748 | A | * | 3/1992 | Simmons, II .............. 417/423.1 |
| 6,065,946 | A | * | 5/2000 | Lathrop .......................... 310/43 |
| 6,126,417 | A | * | 10/2000 | Roth .......................... 417/423.7 |

FOREIGN PATENT DOCUMENTS

| | | |
|---|---|---|
| DE | 297 07 440 | 7/1997 |
| DE | 198 46 220 | 4/2000 |
| DE | 101 03 209 | 7/2002 |
| EP | 0 385 203 | 9/1990 |
| EP | 0 657 653 | 6/1995 |
| GB | 369642 | 3/1932 |
| GB | 797468 | 7/1958 |
| GB | 853245 | 11/1960 |

OTHER PUBLICATIONS

English Abstract for DE 41 11 466.
English Abstract for DE 198 46 220.
Sauter, H.L., u.a.: Messung und Abscheidung von Olnebelaerosolen . . . , In: MTZ Motortechnische Zeitschrift, 62, 2001.

\* cited by examiner

ELECTRIC MOTOR SEALING CONFIGURATION

CROSS-REFERENCE TO RELATED APPLICATION

This application is a National Stage application which claims the benefit of International Application No. PCT/DE2006/001859 filed Oct. 21, 2006 which claims priority based on German Patent Application No. DE 10 2005 062 021.3, filed Dec. 22, 2005, which is hereby incorporated by reference in its entirety.

The present invention relates to an electric motor for driving an inertia separator.

In special applications, electric motors may be used to drive devices that are exposed to fluids or operate with fluids. For example, an electric motor may be used to drive a liquid pump or to drive a centrifuge or another inertia separator, e.g., for separating oil residues in a blow-by gas line of an internal combustion engine. In such applications, there is a need for preventing the respective liquid from penetrating into the interior of the electric motor. To this end, it is fundamentally possible to provide the electric motor with a sealed housing and to design a rotor shaft of the electric motor to lead out of the housing with a seal provided by radial seals. Such radial seals are comparatively expensive and are exposed to wear during operation of the electric motor, so that they may leak over a period of time.

The present invention relates to the problem of providing an improved embodiment for an electric motor, so that it will be characterized in particular by a permanent and effective seal.

This problem is solved according to this invention by the subject matter of the independent claim. Advantageous embodiments are the subject matter of the dependent claims.

The invention is based on the general idea of separating a stator space that accommodates the stator from a rotor space that accommodates the rotor with the help of a housing bottom. To implement this separation, said housing bottom is passed with a nonmagnetic section through a ring gap formed radially between the rotor and stator. Due to this design, it is possible to accommodate the stator in a stator housing that hermetically seals the stator space. The stator as well as other components of the electric motor, in particular electronic components, are thereby protected from impurities and especially from harmful liquids in the stator housing. In contrast with that, the rotor may essentially be used to drive the respective unit without any additional sealing measures. Contacting of the rotor with liquid is not critical here because the respective liquid cannot penetrate into the stator space. For electric commutation, the electric motor operates without brushes, so that no physical contact between the rotor and stator is necessary.

In an advantageous embodiment, an outlet channel may be provided on the nonmagnetic section of the housing bottom, communicating with the preferably cylindrically designed rotor space and leading through the stator space and out of the stator housing. The design of the outlet channel through the stator housing may be implemented in a manner that is sealed anyway and is inexpensive because there are no relative movements between the stator housing and the outlet channel.

In another advantageous embodiment, a bearing support on which the rotor is mounted in a rotational manner by means of a rotor bearing may be designed as a receiving shell and may have an outlet in which the rotor bearing is arranged. During operation of the electric motor, a liquid, e.g., an oil may enter the collecting shell and flow out through the outlet which to this end communicates with the rotor space in particular. The outflowing oil is necessarily carried through the rotor bearing so the latter is automatically lubricated. The oil flowing into the rotor space can be removed through the aforementioned outlet channel.

Additional important features and advantages of the invention are derived from the dependent claims, the drawing and the respective description of the figures on the basis of the drawing.

It is self-evident that the features described above and those yet to be described below may be used not only in the particular combination given but also in other combinations or alone without going beyond the scope of the present invention.

Preferred exemplary embodiments of the invention are depicted in the drawing and are explained in greater detail in the following description.

Figure 1:
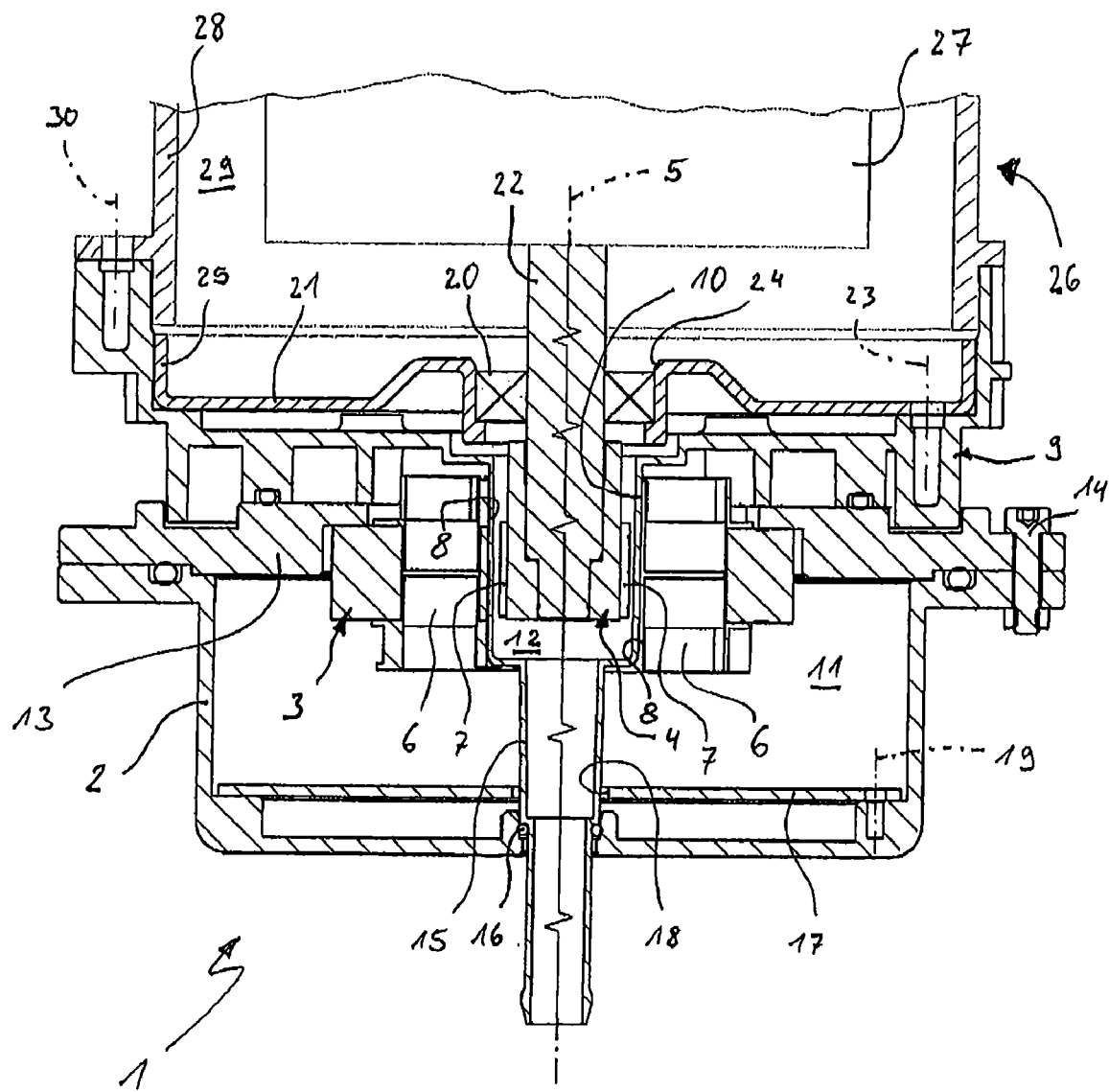
FIG. 1 shows a greatly simplified longitudinal section through an electric motor according to this invention.

According to FIG. 1, an inventive electric motor 1 comprises a stator housing 2, a stator 3 arranged therein and a rotor 4 which is arranged concentrically with the stator 3 with respect to an axis of rotation 5. The electric motor 1 is designed as a brushless electric motor 1. The stator 3 has at least one electromagnetic coil 6 for generating an electromagnetic field rotating about the axis of rotation 5. The rotor 4 has at least one permanent magnet 7 to be able to introduce a torque into the rotor 4 by means of electromagnetic forces.

An annular gap 8 is formed radially between the rotor 4 and the stator 3 and also extends concentrically with the axis of rotation 5.

In addition, the electric motor 1 is equipped with a housing bottom 9 which extends essentially across the axis of rotation 5. The housing bottom 9 is designed and arranged relative to the other components of the electric motor 1 so that together with a nonmagnetic section 10 which is arranged centrally in the housing bottom 9 with respect to the axis of rotation 5, extends through the ring gap 8. Said section 10 thus also extends radially between stator 3 and rotor 4 and in particular also concentrically with the axis of rotation 5. In addition, the housing bottom 9 is designed and arranged so that it separates a stator space 11, which is situated in the interior of the stator housing 2 and in which the stator 3 is arranged, from a rotor space 12, in which the rotor 4 is arranged. Since the section 10 extending in the annular space 8 is designed to be nonmagnetic, e.g., is made of plastic, the electromagnetic forces of the at least one coil 6 of the stator 3 can drive the rotor 4 essentially unhindered. At the same time, a tight separation can be achieved between the rotor 4 and the stator 3. The stator housing 2 in particular can hermetically seal the stator space 11 from the outside.

In the present case, the stator 3 is mounted on a stator support 13 which is characterized by a relatively high rigidity. For example, the stator mount 13 is made of metal. The stator mount 13 is preferably designed as a heat conductor to dissipate the heat generated during operation of the electric motor 1 away from the at least one coil 6 and out of the stator space 11. Suitable thermally conducting materials for this purpose include aluminum or copper or brass and/or alloys thereof, for example. To be able to function as a heat sink, which conducts heat out of the interior of the stator housing 2 toward the outside, the stator mount 13 is arranged axially between the stator housing 2 and the housing bottom 9 with respect to the axis of rotation 5 and thereby forms a type of central open intermediate bottom. Furthermore, the contacting between the stator 3 and the stator mount 13 is designed to cover the largest possible area to achieve an intense thermal conduction. On the one hand, the stator housing 2 is mounted on the stator mount 13, e.g., by means of at least one screw connection 14. On the other hand, the housing bottom 9 is also attached to the stator mount 13; corresponding fastening points are not shown here and may also be formed by screw connections. With the help of the stator mount 13, the stator housing 2 and thus the entire electric motor 1 may be mounted on a corresponding periphery. This periphery may be, for example, a supporting structure on which the electric motor is mounted in the frame of its respective application.

The nonmagnetic section 10 surrounds the rotor space 12 and is preferably designed as a cylindrical section. The rotor space 12 is open on an end facing away from the stator space 11. This open end is at the top in the installed state. The rotor 4 protrudes through the open side into the rotor space 12. In the preferred embodiment shown here, an outlet channel 15 is provided on the nonmagnetic section 10. This outlet channel 15 communicates with the rotor space 12 and leads through the stator space 11 out of the stator housing 2. The outlet channel 15 extends concentrically and coaxially with the axis of rotation 5. The bushing through the stator housing 2 is sealed in a suitable manner, e.g., by means of an O-ring 16. The outlet channel 15 is preferably designed integrally on the cylindrical section 10. Likewise, the cylindrical section 10 is preferably designed integrally on the housing bottom 9. The housing bottom 9 is preferably an injection molded part made of plastic, having the cylindrical section 10 and the outlet channel 15 as integral components.

Various components of the electric motor 1 may be accommodated in the stator space 11, e.g., electric or electronic components. In particular a circuit board 17 for such electric and/or electronic components may be arranged in the stator space 11. This circuit board 17 contains an opening 18, which is arranged centrally here with respect to the axis of rotation 5 and through which the outlet channel 15 passes. The circuit board 17 may be secured on the stator housing 2 by a screw connection 15 as indicated or by other fastening means.

For rotational mounting of the rotor 4, a rotor bearing 20, preferably a radial bearing, which is arranged on a bearing support 21 is provided. The rotor 4 is mounted in this rotor bearing 20 with a rotor shaft 22 and can also be supported axially on the bearing support 21 via the rotor bearing 20. The bearing support 21 is in turn supported axially on the housing bottom 9 and may be secured on this by means of a screw connection 23 as indicated, for example, or with other fastening means.

The bearing support 21 is preferably designed as a collecting dish and has a central outlet 24. The rotor bearing 20 is arranged in the outlet 24. The configuration as a collecting dish is achieved with the bearing support 21 due to the fact that it has an axially protruding collar 25 that is closed in the form of a ring and is situated on the outside radially with respect to the axis of rotation 25, and the outlet 24 in the installed state is below the collar 25. In the installed state, the bearing support 21 and/or the collecting dish is open at the top and can thus collect liquid coming from above and drain it out through the outlet 24. The outlet 24 is open toward the rotor space 12 so that a communicating connection is formed between the outlet 24 and the rotor space 12 and ultimately the outlet channel 15.

The nonmagnetic section 10 is expediently designed with dimensions so that it comes to rest radially on the stator 3 while at the same time a distance can be maintained radially from the rotor 4.

Figure 2A:
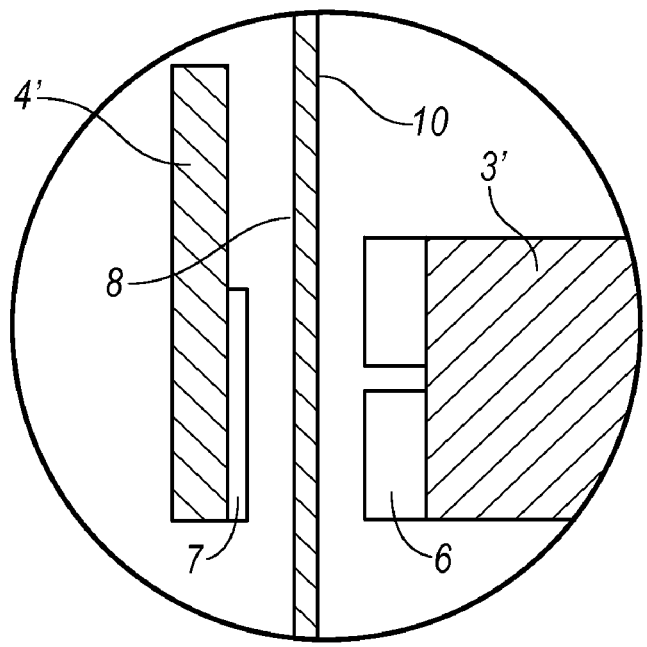
FIG. 2A is an alternative illustration of the electric motor illustrating an external rotor and a stator situated radially inside the rotor.
Figure 2B:
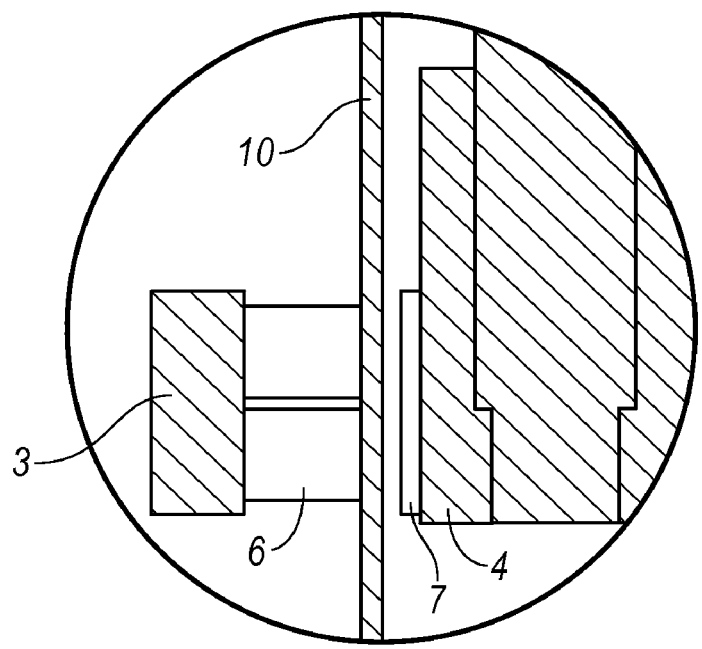
FIG. 2B is another alternative illustration of the electric motor where an outer portion of the nonmagnetic section of the housing bottom radially contacts the stator.

In the improved embodiment shown here, the rotor 4 is designed as a so-called internal rotor because the rotor 4 is arranged on the inside radially with respect to the stator 3. In the case of the internal rotor, the stator 3 is designed in a ring shape. Essentially, however, an illustration in which the rotor 4 is designed as a so-called external rotor which is characterized by a ring-shaped design and a stator 3 situated on the inside radially is also possible, and is shown in FIG. 2A as an external rotor 4' and an internal stator 3'.

Essentially, the electric motor 1 is suitable for driving any equipment. The use of the electric motor 1 for driving equipment that operates with fluids, in particular with liquids, is especially advantageous. The electric motor may be used to drive a pump, for example.

In the exemplary embodiment shown here, the electric motor 1 serves to drive an inertia separator 26. Such an inertia separator 26 may be used with an internal combustion engine, which is installed in a motor vehicle in particular, to clean blow-by gases to remove the entrained oil and other residues. Likewise, such an inertia separator may be used for cleaning the sidestream of an oil lubricant circuit of an internal combustion engine. The inertia separator 26 comprises a rotor 27 which is drive-coupled to the rotor 4 of the electric motor 1. The rotor 27 of the inertia separator 26 may be designed as a centrifuge, for example, or as a disk separator.

With the integral design shown here, the rotor 27 of the inertia separator 26 is connected to the rotor shaft 22 of the rotor 4 of the electric motor 1 in a rotationally fixed manner. A separator housing 28 of the inertia separator 26 surrounds a crude space 29 in which the impurities to be separated, namely the oil in the present case, are separated, collected and removed. With the integral design illustrated here, the separator housing 28 is attached directly to the housing bottom 9, e.g., by means of a screw connection 30 indicated here or other suitable fastening means. The housing bottom 9 is arranged on the separator housing 28 on a side facing the electric motor 1. Consequently, the crude space 29 is open toward the collecting dish and/or the bearing support 21 and thus toward the drain 24 and ultimately toward the rotor space 12.

During operation of the electric motor 1 and/or the inertia separator 26, the oil separated in the crude space 29 may thus collect initially in the bearing support 21 and/or in the collecting dish and then flow over the outlet 24 through the rotor bearing 20 and into the rotor space 12 when there is a corresponding oil level. At the same time, automatic lubrication of the rotor bearing 20 is ensured. From the rotor space 12, the oil is removed through the stator space 11 via the outlet channel 15. Penetration of oil into the stator space 11 is thus impossible in normal operating states.

The invention claimed is:

1. An electric motor for driving an inertia separator, comprising:
   a stator, which is arranged in a stator space enclosed by a stator housing;
   a rotor, which is arranged in a rotor space concentrically with the stator with regard to an axis of rotation;
   a ring gap formed radially between the rotor and the stator such that it separates the stator space from the rotor space;
   an inertia separator including a second rotor operably connected to the rotor;

a separator housing containing the second rotor, a housing bottom defines an opening that is oriented towards and fluidly connected to the separator housing; and an outlet channel extending longitudinally along the axis of rotation from the separator housing, through the rotor space and the stator space, the outlet channel extending about the axis of rotation exits out of the stator housing, opposite the separator housing.

2. The electric motor according to claim 1, wherein a nonmagnetic section is configured on the housing bottom and is a cylindrical section arranged coaxially with the rotor and the stator in the ring gap.

3. The electric motor according to claim 1, wherein the rotor protrudes into the rotor space through the opening therein facing away from the stator space.

4. The electric motor according to claim 1, further comprising a rotor bearing arranged on a bearing support supported on the housing bottom, wherein the rotor is rotatably mounted in the rotor bearing.

5. The electric motor according to claim 4, wherein the bearing support provides a bowl shaped collecting dish including an outlet in which the rotor bearing is arranged.

6. The electric motor according to claim 5, wherein the outlet interfaces with the rotor space.

7. The electric motor according to claim 1, further comprising a stator mount arranged between the stator housing and the housing bottom, wherein the stator is attached to the stator mount.

8. The electric motor according to claim 7, wherein the stator housing is attached to a periphery supporting element via the stator mount.

9. The electric motor according to claim 7, wherein the stator mount is made of a thermally conducting material.

10. The electric motor according to claim 1, wherein the rotor of the electric motor is designed as an internal rotor.

11. The electric motor according to claim 1, wherein the rotor of the electric motor is designed as an external rotor.

12. The electric motor according to claim 1, wherein, the rotor has at least one permanent magnet.

13. The electric motor according to claim 1, wherein the rotor of the electric motor is designed as an internal rotor and an outer portion of a nonmagnetic section configured on the housing bottom is in radial contact with the stator.

14. The electric motor according to claim 1, wherein the outlet channel extends through an opening in the stator housing and is fixed in relation to the stator housing.

15. The electric motor according to claim 14, further comprising a rotor bearing arranged on a bearing support supported on the housing bottom, wherein the rotor is rotatably mounted in the rotor bearing, and where the bearing support provides a bowl shaped collecting dish including an outlet in which the rotor bearing is arranged.

16. The electric motor according to claim 1, further comprising a rotor bearing arranged on a bearing support supported on the housing bottom, wherein the rotor is rotatably mounted in the rotor bearing, and where the bearing support provides a bowl shaped collecting dish including an outlet in which the rotor bearing is arranged.

17. An inertia separator electric motor, comprising:
a stator housing;
a housing bottom configured to include a nonmagnetic section;
a stator, configured in a stator space within the stator housing;
a first rotor, configured within a first rotor space, and configured concentrically with the stator with regard to an axis of rotation,
a ring gap, the ring gap is configured radially between the rotor and the stator to separate the stator space from the rotor space, wherein the nonmagnetic section extends through the ring gap;
an outlet channel arranged on the nonmagnetic section, wherein the outlet channel interfaces with the first rotor space and leads through the stator space and out of the stator housing;
at least one circuit board providing electronic components of the electric motor arranged in the stator housing and containing an aperture through which the outlet channel passes;
an inertia separator, the inertia separator including a separator rotor operably connected to the first rotor; and
a separator housing enclosing a void containing the separator rotor, wherein the housing bottom is arranged between the separator housing and the stator housing such that the nonmagnetic section of the housing bottom defines an opening in the rotor space that is oriented towards and fluidly connected to the void in the separator housing.

18. An oil inertia separator for separating oil from blow-by gas of an internal combustion engine, comprising:
an electric motor driving the inertia separator, including:
a stator arranged in a stator space enclosed by a stator housing,
a rotor arranged in a rotor space concentrically with the stator with regard to an axis of rotation,
a ring gap formed radially between the rotor and the stator such that it separates the stator space from the rotor space,
a housing bottom including a nonmagnetic section extending through the ring gap,
an inertia separator including a second rotor operably connected to the rotor;
a separator housing wherein the housing bottom is arranged on the separator housing on a side facing the electric motor such that the rotor space is open toward the second rotor; and
an outlet channel extending longitudinally about the axis of rotation and arranged on the nonmagnetic section, wherein the outlet channel interfaces with the rotor space and leads longitudinally through the stator space and along the axis of rotation out of the stator housing.

19. The oil inertia separator according to claim 18, wherein the outlet channel extends through an opening in the stator housing and is fixed in relation to the stator housing.

20. The oil inertia separator according to claim 18, further comprising a rotor bearing arranged on a bearing support supported on the housing bottom, wherein the rotor is rotatably mounted in the rotor bearing, and where the bearing support provides a bowl shaped collecting dish including an outlet in which the rotor bearing is arranged.

21. The oil inertia separator according to claim 19, further comprising a rotor bearing arranged on a bearing support supported on the housing bottom, wherein the rotor is rotatably mounted in the rotor bearing, and where the bearing support provides a bowl shaped collecting dish including an outlet in which the rotor bearing is arranged.

* * * * *